United States Patent [19]
Covert et al.

[11] Patent Number: 4,724,861
[45] Date of Patent: Feb. 16, 1988

[54] FUEL TANK VENTING

[75] Inventors: Charles H. Covert, Manchester; Joseph Fornuto, Rochester, both of N.Y.; Roy A. Giacomazzi, Washington Township, Macomb County, Mich.; William E. Gifford, Hemlock; Carl H. Sherwood, Brockport, both of N.Y.

[73] Assignee: General Motors Corporation, Detroit, Mich.

[21] Appl. No.: 897,376

[22] Filed: Aug. 18, 1986

[51] Int. Cl.$^4$ ............................................. F16K 24/00
[52] U.S. Cl. ................................. 137/202; 137/588; 137/599; 141/59; 141/302; 220/86 R
[58] Field of Search .................. 141/59, 302, 392; 220/86 R; 137/202, 588, 599

[56] References Cited

U.S. PATENT DOCUMENTS

| | | | |
|---|---|---|---|
| 3,994,323 | 11/1976 | Takahata et al. | 141/302 |
| 4,059,135 | 11/1977 | Honsel | 141/207 |
| 4,062,384 | 11/1977 | Frahm et al. | 137/202 |
| 4,441,533 | 4/1984 | Snyder et al. | 141/59 |
| 4,630,749 | 11/1986 | Armstrong et al. | 141/59 |

Primary Examiner—A. Michael Chambers
Attorney, Agent, or Firm—C. K. Veenstra

[57] ABSTRACT

A fuel tank filler neck has a partition providing a vent orifice for vapor flow from a fuel introduction tube to a vapor discharge fitting. A ball valve guided beneath the orifice is adapted to float into engagement across the orifice to prevent liquid fuel from passing through said orifice. A filler neck restrictor plate is carried on an actuating arm that has a cam surface engaging the ball valve. The cam surface engages the ball valve across the orifice to inhibit flow of fuel vapor through the orifice when the restrictor plate inhibits introduction of fuel through the filler neck, and permits the ball valve to drop away from the orifice to permit flow of fuel vapor through said orifice when the restrictor plate permits introduction of fuel through the filler neck.

4 Claims, 5 Drawing Figures

FUEL TANK VENTING

TECHNICAL FIELD

This invention relates to control of vapor released during filling of a fuel tank.

SUMMARY OF THE INVENTION

When filling an automotive fuel tank, the fuel vapor in the space above the rising liquid level is displaced out of the tank. To avoid releasing the fuel vapor to the atmosphere, earlier proposals have vented the vapor to a vapor storage canister.

This invention provides a fuel tank vent actuator that opens a vent to allow unrestricted flow of fuel vapor to a vapor storage canister during filling of the tank, and that restricts the vent to inhibit flow of fuel vapor to the canister at other times.

The details as well as other features and advantages of two embodiments of this invention are set forth in the remainder of the specification and are shown in the drawings.

THE PREFERRED EMBODIMENTS

Figure 1:
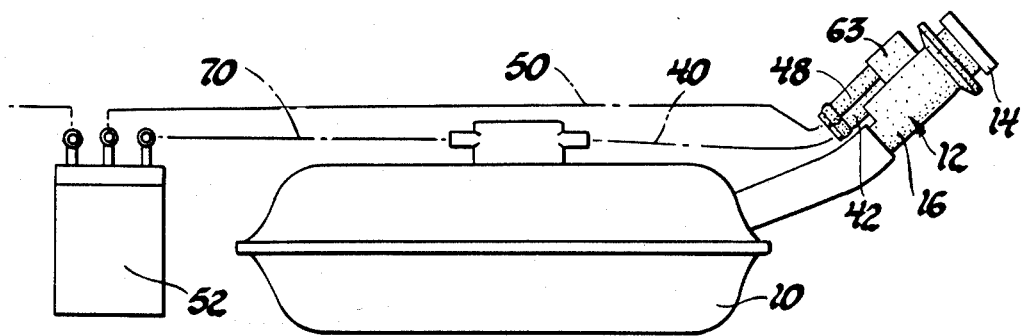
FIG. 1 is a schematic view of an automotive fuel tank venting system employing a first embodiment of this invention.
Figure 2:
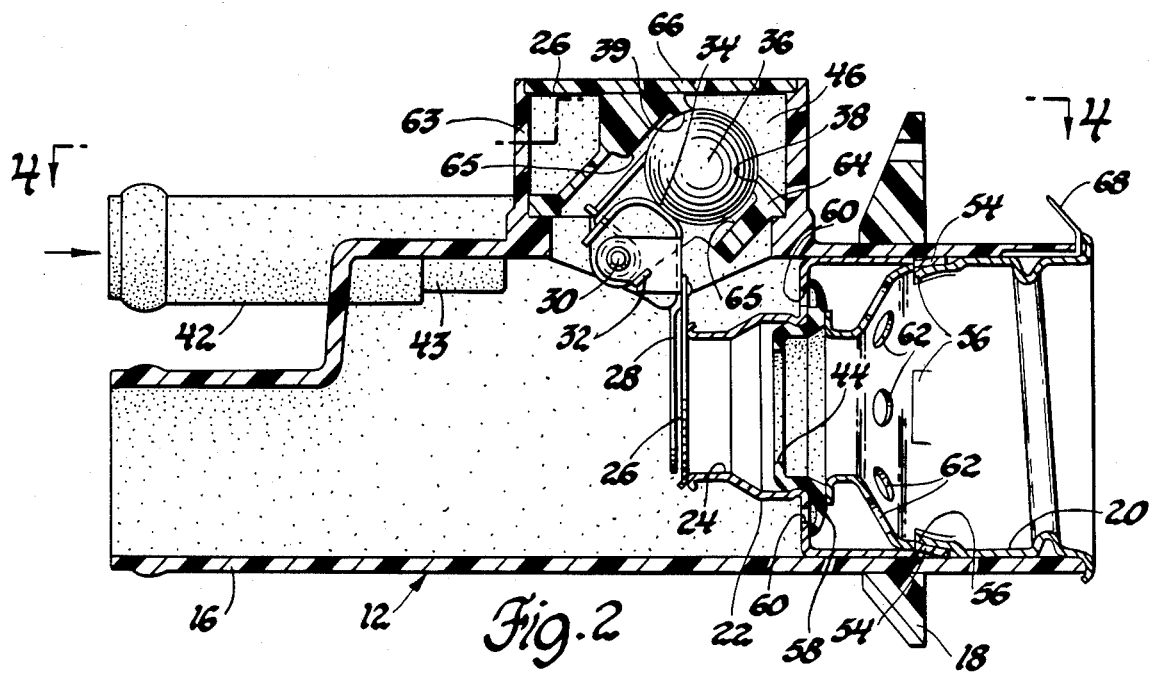
FIG. 2 is an enlarged sectional view of the filler neck and vent actuator for the FIG. 1 fuel tank.
Figure 3:
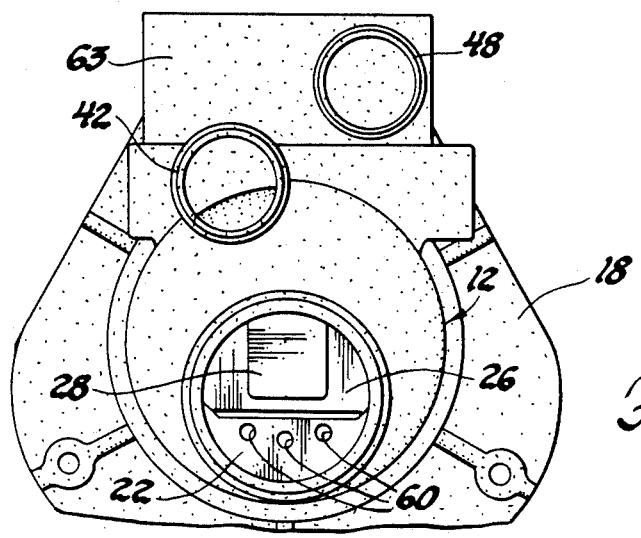
FIG. 3 is an end view of the FIG. 1 filler neck.
Figure 4:
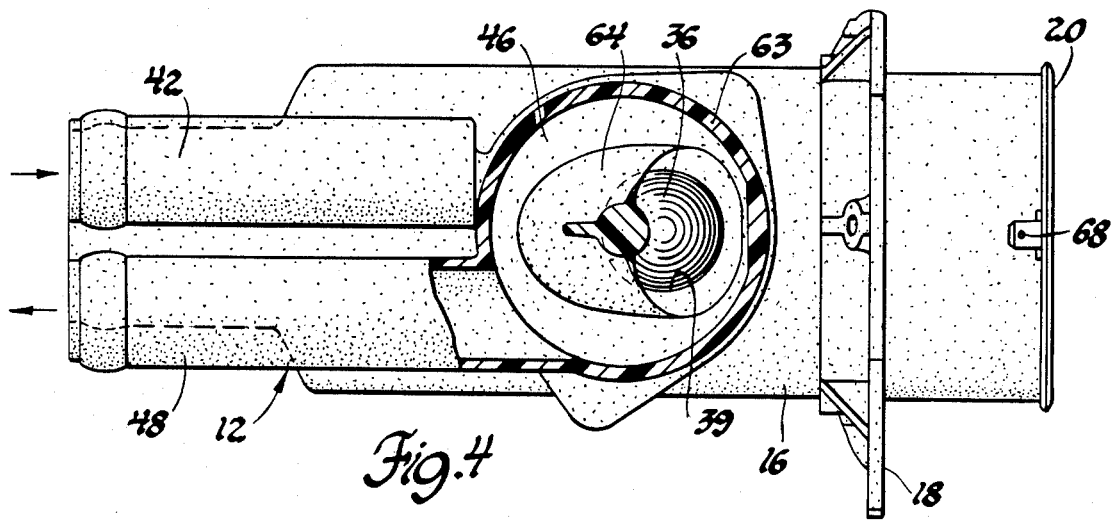
FIG. 4 is a sectional view of the FIG. 1 filler neck, taken along line 4—4 of FIG. 1.

Referring first to FIGS. 1-4, a fuel tank 10 has a filler neck 12 through which fuel is introduced to the tank. Filler neck 12 is normally closed by a filler cap 14.

Filler neck is formed of a plastic outer tube 16 supported by a flange 18. A metal insert 20 is threaded to receive filler cap 14, and a metal insert 22 has a restricted throat 24 through which the correct size filler nozzle can be inserted to introduce liquid fuel to tank 10.

A restrictor plate 26 is carried on an actuating arm 28 that is mounted on an axle 30. A spring 32 biases restrictor plate 26 and actuating arm 28 counterclockwise to the position shown; in that position, restrictor plate 26 inhibits introduction of fuel through the throat 24 of filler neck 12, and a cam surface 34 on actuating arm 28 engages a ball valve 36 across a vent orifice 38 surrounded by a seat 39.

When the filler nozzle is received through throat 24, the filler nozzle displaces restrictor plate 26 and actuating arm 28 clockwise about axle 30 to a position permitting introduction of fuel through filler neck 12. The cam surface 34 on actuating arm 28 then permits valve 36 to drop away from seat 39.

As the filler nozzle introduces liquid fuel through filler neck 12 to tank 10, fuel vapor is displaced from tank 10 through a vent line 40 to a fitting 42 opening at 43 into the outer tube 16 of filler neck 12. An elastomeric seal 44 embraces the filler nozzle to preclude escape of the fuel vapor out through the open end of filler neck 12, and the fuel vapor accordingly is directed through vent orifice 38 and a chamber 46 to a fitting 48, and then through a vent line 50 to a fuel vapor storage canister 52.

When liquid fuel fills tank 10 and rises into filler neck 12, ball valve 36 floats into engagement with seat 39 to prevent the liquid fuel from flowing through vent orifice 38 to canister 52.

It will be noted that insert 22 has several inwardly lanced tabs 54 received in inwardly lanced openings 56 in insert 22 to secure insert 22 to insert 20, and that seal 44 is supported between inserts 20 and 22. Seal 44 includes a pressure relief umbrella valve 58 that inhibits the flow of fuel vapor through apertures 60 in insert 22; should the pressure in tank 10 rise above a desired upper limit during the filling process, umbrella valve 58 opens to allow pressure relief through apertures 60 in insert 22 and apertures 62 in insert 20.

Chamber 46 is formed by a housing 63 projecting from outer tube 16. Vent orifice 38 and valve seat 39 are formed in a partition 64 that separates outer tube 16 from chamber 46, and partition 64 includes ribs 65 that guide ball valve 36. Chamber 46 is closed by a cap 66.

A terminal 68 is connected to insert 20 and grounded to preclude accumulation of an electrical charge.

An additional vent line 70 extends directly from tank 10 to canister 52 to allow restricted flow of fuel vapor from tank 10 to canister 52 when ball valve 36 is seated.

Figure 5:
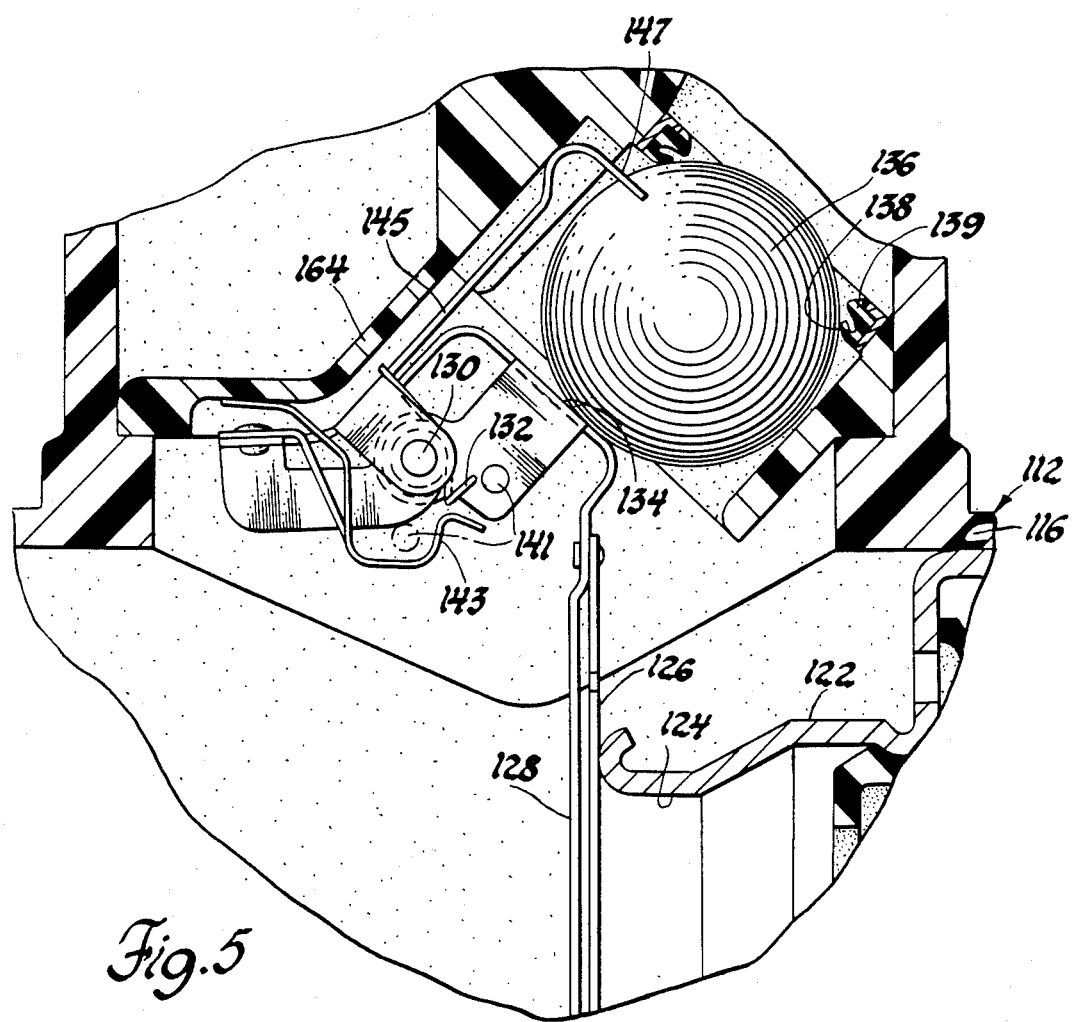
FIG. 5 is a sectional view of a portion of a filler neck and vent actuator employing a second embodiment of this invention.

The filler neck 112 shown in FIG. 5 is similar in most respects to filler neck 12. It has an outer tube 116 and an insert 122 with a restricted throat 124 through which the correct size filler nozzle is inserted.

A restrictor plate 126 is inserted to an actuating arm 128 mounted on an axle 130. A spring 132 biases restrictor plate 126 and actuating arm 128 counterclockwise to the position shown; in that position, restrictor plate 126 inhibits introduction of fuel through the throat 124 of filler neck 112 and a cam surface 134 on actuating arm 128 engages a ball valve 136 across a vent orifice 138 formed in a lip seal 139 mounted in a partition 164.

When the filler nozzle is inserted through throat 124, the filler nozzle displaces restrictor plate 126 and actuating arm 128 clockwise about axle 130 to a position permitting introduction of fuel through filler neck 112. The cam surface 134 on actuating arm 128 then moves away from ball valve 136, and a pin 141 on actuating arm 128 engages a spring clip 143 to exert a clockwise bias on a retractor 145 also supported on axle 130. Retractor 145 has a pair of fingers 147 that thereupon disengage ball valve 136 from lip seal 139.

After retractor 145 has disengaged valve 136 from seal 139, pin 141 snaps over spring clip 143 to the dotted line position shown. In that position, pin 141 allows retractor 145 to return to the position shown, and ball valve 136 accordingly is free to float back into engagement with lip seal 139. When the filler nozzle is later removed from filler neck 112, spring 132 again moves restrictor plate 126 and actuating arm 128 counterclockwise to the position shown, snapping pin 141 over spring clip 143 in the process.

By employing a lip seal 139 to form a seat for ball valve 136, engagement of ball valve 136 with its seat essentially precludes the transfer of fuel vapor through vent orifice 138 to the fuel vapor storage canister.

The embodiments of the invention in which an exclusive property or privilege is claimed are defined as follows:

1. A filler neck for a fuel tank, said filler neck having a tube through which fuel is introduced from a filler nozzle to the fuel tank, a fuel vapor discharge fitting, and a partition providing a vent orifice for vapor flow from said tube to said fitting, a ball valve guided beneath said orifice and adapted to float into engagement across said orifice to prevent liquid fuel from passing through said orifice to said fitting, and an actuating arm that carries a plate engageable by said nozzle for movement from a first position inhibiting introduction of fuel through said tube to a second position permitting introduction of fuel through said tube, said actuating arm having a cam surface engaging said ball valve for causing said ball valve to engage across said orifice to inhibit flow of fuel vapor through said orifice when said plate is in said first position, and for permitting said ball valve to drop away from said orifice to permit fuel vapor to flow through said orifice when said plate is in said second position.

2. A filler neck for a fuel tank, said filler neck having a tube through which fuel is introduced from a filler nozzle to the fuel tank, a fuel vapor discharge fitting, and a partition providing a vent orifice for vapor flow from said tube to said fitting, a ball valve guided beneath said orifice and adapted to float into engagement across said orifice to prevent liquid fuel from passing through said orifice to said fitting, an actuating arm that carries a plate engageable by said filler nozzle for movement from a first position inhibiting introduction of fuel through said tube to a second position permitting introduction of fuel through said tube, said actuating arm having a cam surface engaging said ball valve for causing said ball valve to engage across said orifice to inhibit flow of fuel vapor through said orifice when said plate is in said first position, and for permitting said ball valve to drop away from said orifice to permit fuel vapor to flow through said orifice when said plate is in said second position, and a retractor engaged by said actuating arm for disengaging said ball valve from said orifice as said actuating arm carries said plate from said first position to said second position.

3. A filler neck for a fuel tank, said filler neck having a tube through which fuel is introduced from a filler nozzle to the fuel tank, a fuel vapor discharge fitting, and a partition providing a vent orifice for vapor flow from said tube to said fitting, a lip seal providing a valve seat about said orifice, a ball valve guided beneath said orifice and adapted to float into engagement with said lip seal to prevent liquid fuel from passing through said orifice to said fitting, and an actuating arm that carries a plate engageable by said filler nozzle for movement from a first position inhibiting introduction of fuel through said tube to a second position permitting introduction of fuel through said tube, said actuating arm having a cam surface engaging said ball valve for causing said ball valve to engage said lip seal to preclude flow of fuel vapor through said orifice when said plate is in said first position, and for permitting said ball valve to drop away from said lip seal to permit fuel vapor to flow through said orifice when said plate is in said second position.

4. A filler neck for a fuel tank, said filler neck having a tube through which fuel is introduced from a filler nozzle to the fuel tank, a fuel vapor discharge fitting, and a partition providing a vent orifice for vapor flow from said tube to said fitting, a lip seal providing a valve seat about said orifice, a ball valve guided beneath said orifice and adapted to float into engagement with said valve seat to prevent liquid fuel from passing through said orifice to said fitting, an actuating arm that carries a plate engageable by said filler nozzle for movement from a first position inhibiting introduction of fuel through said tube to a second position permitting introduction of fuel through said tube, said actuating arm having a cam surface engaging said ball valve for causing said ball valve to engage said valve seat to preclude flow of fuel vapor through said orifice when said plate is in said first position, and for permitting said ball valve to drop away from said valve seat to permit fuel vapor to flow through said orifice when said plate is in said second position, and a retractor engaged by said actuating arm for disengaging said ball valve from said valve seat as said actuating arm carries said plate from said first position to said second position.

* * * * *